United States Patent [19]

Smith

[11] Patent Number: 4,468,336

[45] Date of Patent: Aug. 28, 1984

[54] LOW DENSITY LOOSE FILL INSULATION

[76] Inventor: Ivan T. Smith, 401 McDaniel Rd., NW., Marietta, Ga. 30064

[21] Appl. No.: 510,622

[22] Filed: Jul. 5, 1983

[51] Int. Cl.³ .......................... C04B 43/12; E04B 1/76
[52] U.S. Cl. ...................................... 252/62; 106/168; 106/163.1; 162/146; 162/147; 162/148; 162/159; 428/359; 428/360; 428/920; 428/921
[58] Field of Search ............. 252/62; 106/163 R, 168; 162/146, 147, 148, 159; 428/359, 360, 920, 921

[56] References Cited

U.S. PATENT DOCUMENTS

| | | | |
|---|---|---|---|
| 2,808,338 | 10/1957 | Bruno et al. | 252/62 |
| 4,167,604 | 9/1979 | Aldrich | 252/62 |
| 4,174,223 | 11/1979 | Steen | 252/62 |
| 4,373,005 | 2/1983 | Goodwin | 252/62 |
| 4,374,171 | 2/1983 | McCarter | 428/921 |

Primary Examiner—John E. Kittle
Assistant Examiner—Robert A. Way
Attorney, Agent, or Firm—Thomas & Kennedy

[57] ABSTRACT

A low settled density loose fill heat insulation for building structures is formed by the addition to cellulose insulation of staple fibers selected from the group polypropylene, acetate, polyethylene, polyester, acrylic and vinyl. The staple fibers extend the cellulose insulation.

6 Claims, 2 Drawing Figures

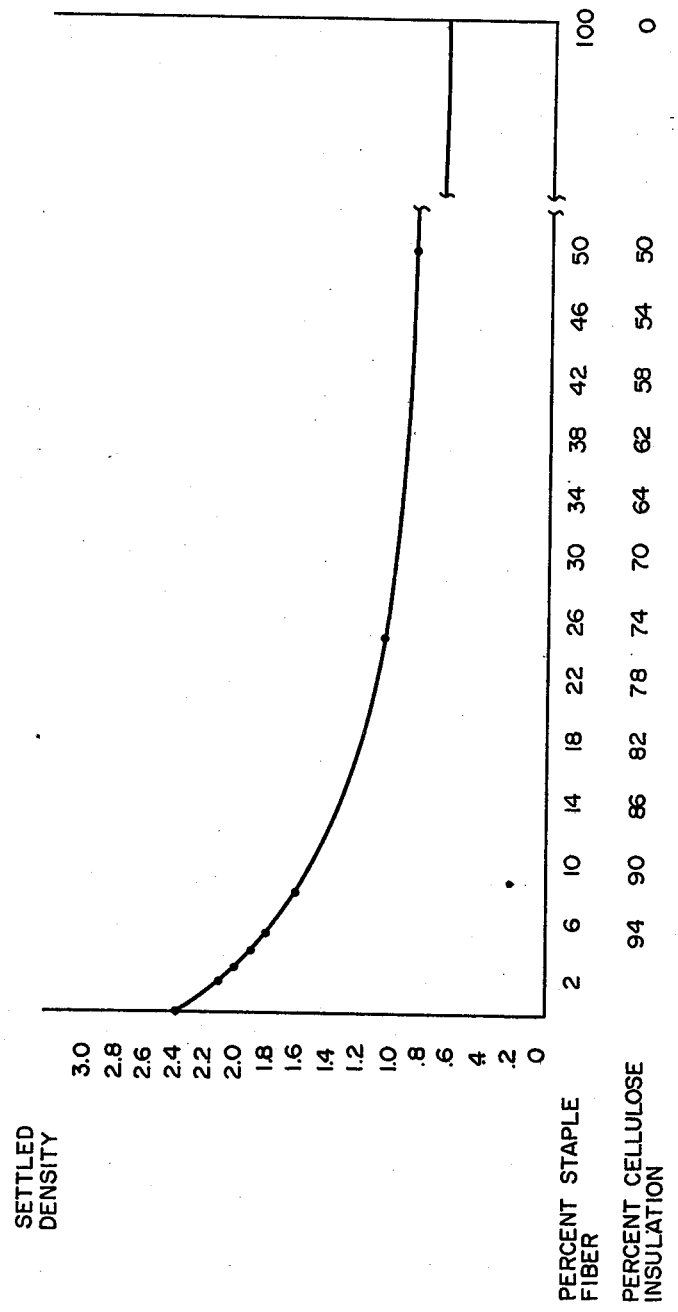

LOW DENSITY LOOSE FILL INSULATION

BACKGROUND OF THE INVENTION

This invention relates to loose fill heat insulation for building structures, particularly to the type of loose fill insulation that is blown into attics, walls, and other large spaces.

When loose fill insulation is installed in a building structure, usually by being carried by an air stream through a flexible conduit and blown into place, it is important that the insulation have a low settled density, in that it does not become packed or compressed after having been installed. The low settled density enables the loose fill insulation to maintain a high R value or high thermal resistance, less weight of the insulation is required to fill the spaces being insulated, and less time is required for the workers to fill the space with the material. Other attendant advantages include the requirement of less fire retardant chemicals per pound of the insulation, and less weight to be supported by the building structure. One of the most significant improvements is that a low settled density of loose fill insulation improves the smoldering characteristics of the insulation, in that the potential for insulation smoldering is significantly reduced. These and other characteristics, such as corrosion characteristics, are set forth for acceptable loose fill insulations by U.S. Government General Services Administration Standard HH-I-515D dated June 15, 1978, by Consumer Product Safety Commission Safety Standard, 16 CFR, Part 1209, and by A.S.T.M. C739.

The conventional loose fill cellulose insulation is cellulose treated with a fire retardant. The cellulose can comprise virtually any cellulosic material that can flow in an air stream, and preferably the cellulose should be of low density. The cellulose is treated with a fire retardant such as a mixture of equal parts of boric acid and borax 5 mol, by coating the cellulose with the fire retardant.

It has been found that when the settled density of loose fill cellulosic insulation is reduced, less fire retardant per pound of insulation is required to achieve low smoldering characteristics.

SUMMARY OF THE INVENTION

Briefly described, the present invention comprises a loose fill insulation for use as a heat insulator in a building structure which includes a mixture of loose fill cellulosic insulation and a staple fiber mixed together so as to extend the cellulosic insulation, so that the mixture forms a low settled density loose fill insulation.

Thus, it is an object of this invention to provide loose fill heat insulation material for building structures which has a low settled density and therefore is inexpensive in that less weight of insulation is required per unit of volume to be filled with the insulation and the thermal resistance of the insulation is high.

Another object of this invention is to provide a loose fill heat insulation that is inexpensive to manufacture, which can be installed with conventional equipment, and which has a low settled density and therefore requires less total weight of insulation material for filling a space to be insulated.

Another object of this invention is to provide a loose fill heat insulation material which meets the appropriate regulations concerning building structures, and which is inexpensive to manufacture and to install.

Other objects, features and advantages of the invention will be become apparent upon reading the following specification, when considering the accompanying drawing.

BRIEF DESCRIPTION OF THE DRAWING

FIG. 2 comprises a graph that illustrates the settled density in pounds per cubic foot in comparison to the percentage, by weight, of a mixture of loose fill cellolusic insulation and staple fiber.

DETAILED DESCRIPTION

Figure 1:
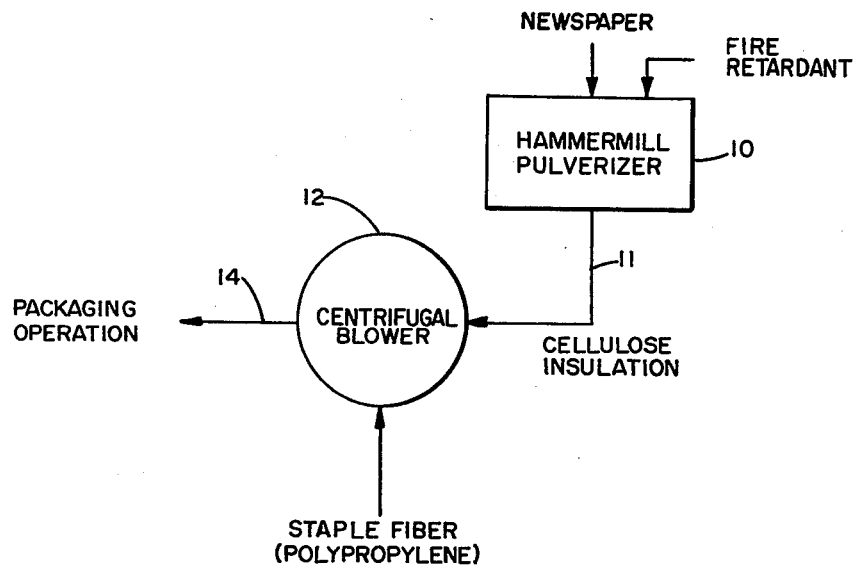
FIG. 1 is a schematic illustration of an example of how the loose fill insulation can be produced.

Nonwoven, man-made staple fibers are added to loose fill cellulosic insulation in order to yield a mixture that has a settled density substantially less than the normal settled density of the cellulosic material. The staple fibers are under 20 mm in length and up to 60 Denier, which when added to the loose fill cellulosic insulation in amounts and in a fashion to be described will yield a loose fill insulation that has lower blown and settled densities than if the fibers had not been added. In addition, the employment of these fibers in the amounts and in a fashion to be described will not reduce or otherwise render the original loose fill cellulosic insulation any less fire resistant than if it had not been added.

First, the loose fill cellulosic insulation that forms the base or principal part of the composition comprises loose, low density cellulose treated with fire retardant such as a mixture of equal parts of boric acid and borax 5 mol, which conforms to all known federal regulations and federal standards, such as 16 CFR, Part 1209 and A.S.T.M. C739. The cellulose is of particle sizes small enough to be carried by an air stream through a flexible conduit into a building structure and blown into place within the structure.

Second, the staple fibers are selected from a group such as olefin, including polypropylene and poly ethylene, acetate, arcylic, vinyl and polyester, and equivalent low density, man-made fibers which serve to impart the significant lowering of density to the new composition.

The mode of preparing the new composition requires installation of an add-on apparatus which retrofits to any standard manufacturing system for making loose fill cellulosic insulation. For example, by metering a 2% to 8% by weight of staple fiber to loose fill cellulose insulation so as to combine the fiber with the already manufactured cellulosic insulation in an airstream generated by blowing apparatus, or by the addition of the staple fiber to the cellulosic insulation in a mixing arrangement, an improved loose fill insulation will result which has much lower density characteristics than the original cellulosic insulation. The improved insulation is later moved through a flexible conduit and blown into place in a building structure, and the movement with the air stream through the conduit tends to further mix the fibers with the cellulose.

An example of apparatus suitable for forming a blown mixture is illustrated in FIG. 1, which comprises a hammermill pulverizer 10 to which newspaper and fire retardant are supplied. The emerging product is conventional cellulose insulation as described herein, which is drawn through a conduit 11 to a centrifugal blower 12. The staple fibers are fed to the blower inlet and mixed with the cellulose insulation in the blower and further mixed as the substance moves through the conduit 14 downstream of the blower to a receptacle.

Typical blown density characteristics of loose fill cellulosic insulation as determined by A.S.T.M. C739 are on the order of 2.0 pounds per cubic foot. With the addition of approximately 5% of staple fibers, the blown density of the mixture is in the order of 1.3 pounds per cubic foot. Typical settled density characteristics of loose fill cellulosic insulation as determined by U.S. Government Service Administration Standard HH-I-515D are in the order of 2.5 pounds per cubic foot. With the addition of approximately 5% of the staple fibers, the settled density of the mixture is in the order of 1.8 pounds per cubic foot.

Those skilled in the art of cellulose insulation manufacturing techniques will be able to make the composition, and will be the best judge of the proportions to be used; however, research with respect to one system has shown that between approximately 2% and 8% by weight add-on of staple fiber, by adding the staple fiber to the cellulose insulation in an air stream, will yield optimum reduction of density versus the cost of the added fiber. The use of the entire composition forms the value of the invention, rather than in the exact proportions of the materials of the mixture. The precise proportions may be varied due to differences in manufacturing systems and characteristics of the loose fill cellulosic insulation being manufactured by a particular system prior to the addition of the staple fibers. The same beneficial results will be obtained even though the proportions may be varied from a precise formula.

As illustrated in the drawing, it will be noted that a settled density of loose fill cellulosic insulation without the addition of staple fibers is in the order of 2.5 pounds per cubic foot. When from 2% to 8% by weight of the fibers are added to the cellulosic insulation, a radical drop in the settled density occurs, to the range of approximately 2.1 to 1.7 pounds per cubic foot. As additional fibers are added, the settled density continues to drop; however, the rate of change in settled density becomes much lower as the percentage of staple fibers in the mixture approaches 25% by weight of staple fibers.

EXAMPLE 1

Loose fill cellulosic insulation and polypropylene fibers were mixed together in a container by placing the cellulosic insulation and the fibers in the container and agitating the mixture to effect a substantially even distribution. The mixture was then blown through a standard insulation blowing machine. 0.02 pounds of fibers were added to 2 pounds of cellulose insulation and after the mixture was evaluated, additional fibers were added to and mixed with the mixture. The fibers averaged about 10 mm in length and 15 Denier. The loose fill cellulose insulation had a settled density of 2.5 pounds per cubic foot before mixing with the fibers. The settled densities of the mixtures were determined as follows:

TABLE 1

| Pounds of Cellulose | Pounds of Fibers | Settled Density |
| --- | --- | --- |
| 2 | 0 | 2.5 |
| 2 | 0.04 | 2.1 |
| 2 | 0.06 | 2.1 |
| 2 | 0.08 | 1.9 |

TABLE 1-continued

| Pounds of Cellulose | Pounds of Fibers | Settled Density |
| --- | --- | --- |
| 2 | 0.11 | 1.8 |
| 2 | 0.17 | 1.7 |
| 2 | 0.67 | 1.1 |
| 2 | 2 | 0.9 |
| 0 | 2 | 0.7 |

EXAMPLE 2

Example 1 was repeated but the Denier of the staple fibers was changed to 1.8, 4, 18, 20 and 60 respectively, and the settled density of each mixture was substantially the same as shown in Table 1 for Deniers 1.8, 4, 15, 18 and 20, but there began to be less change in settled density of the mixture for 60 Denier fibers in the range below 50% fibers in the mixture.

EXAMPLE 3

Example 1 was repeated but the length of the staple fibers averaged approximately 20 mm in one test, and approximately 4 mm in another test. It was found that the settled density of the mixture was not substantially changed from Table 1.

EXAMPLE 4

Example 1 was repeated but the staple fibers were polyvinyl acetate in one test, polyethylene in another test, polyester in another test, and acrylic in another test. The settled densities of the mixtures were determined to be substantially the same as in Table 1. When the lengths of the fibers were varied approximately as described in Example 3 approximately the same results were determined as set forth in Example 3.

While this invention has been described in detail with particular reference to preferred embodiments thereof, it will be understood that variations and modifications can be effected within the spirit and scope of the invention as described hereinbefore and as defined in the appended claims.

I claim:

1. A loose fill insulation for use as a low settled density heat insulator in a building structure comprising a mixture of loose fill cellulosic insulation and staple fibers from a group of fibers consisting of polypropylene, acetate, acrylic, vinyl, polyethelyene, and polyester.

2. The insulation of claim 1 and wherein the fibers are of a length between 4 and 20 mm.

3. The insulation of claim 1 and wherein the loose fill cellulosic insulation has a settled density on the order of about 2.5 pounds per cubic foot before mixing with the fibers, and the mixture of cellulosic insulation with from 2% to 25% by weight fibers has a settled density in the order of from 2.1 pounds per cubic foot to about 1.1 pounds per cubic foot.

4. The insulation of claim 1 and wherein the cellulosic insulation comprises a cellulose material with a fire retardant applied thereto.

5. The insulation of claim 1 characterized by the loose fill cellulosic insulation having been moved by an air stream, and the fibers having been added in an amount of from 2% to 8% by weight to the cellulosic insulation as the cellulosic insulation was moved by the air stream, with the mixture having an air blown density in the order of 1.3 pounds per cubic foot.

6. The insulation of claim 1 and wherein the fibers are between 1.8 and 60 Denier.

* * * * *